United States Patent [19]
Edwards

[11] Patent Number: 5,335,023
[45] Date of Patent: Aug. 2, 1994

[54] MULTI-STANDARD VIDEO MATRIX DISPLAY APPARATUS AND ITS METHOD OF OPERATION

[75] Inventor: Martin J. Edwards, Crawley, England

[73] Assignee: U.S. Philips Corporation, New York, N.Y.

[21] Appl. No.: 34,039

[22] Filed: Mar. 22, 1993

[30] Foreign Application Priority Data

Apr. 7, 1992 [GB] United Kingdom ............... 9207527

[51] Int. Cl.$^5$ .................... H04N 5/66; H04N 3/14
[52] U.S. Cl. .................... 348/800; 348/458; 345/100
[58] Field of Search ............ 358/140, 11, 230, 236, 358/240, 241, 56, 59; 340/784; H04N 3/14, 5/66

[56] References Cited

U.S. PATENT DOCUMENTS

| | | | |
|---|---|---|---|
| 4,511,926 | 4/1985 | Crossland et al. | 358/241 |
| 5,168,270 | 12/1992 | Masumori | 358/56 |
| 5,223,824 | 6/1993 | Takeda et al. | 340/784 |

FOREIGN PATENT DOCUMENTS

| | | | |
|---|---|---|---|
| 0346028 | 12/1989 | European Pat. Off. | H04N 3/12 |
| 0461928 | 12/1991 | European Pat. Off. | G09G 3/36 |
| 3836558 | 5/1990 | Fed. Rep. of Germany | H04N 3/10 |
| 63-169884 | 7/1988 | Japan | H04N 5/66 |
| 1286588 | 11/1989 | Japan | H04N 3/66 |

*Primary Examiner*—Mark R. Powell
*Assistant Examiner*—Jeffrey S. Murrell
*Attorney, Agent, or Firm*—Robert J. Kraus

[57] ABSTRACT

In a matrix display apparatus for displaying video signal of two or more different standards, such as PAL and NTSC standards comprising a display panel (10), for example, a liquid crystal display panel, having a row and column array of picture elements (12), a column driver circuit (22) for sampling lines of an applied video signal (25) and supplying data signals to the panel (10), a row driver circuit (20) for scanning the rows of picture elements in turn, and a control circuit (21) controlling the timing of the operations of the row and column driver circuits (20,22), the row driver circuit (20) is controlled by signals ST,CLK so as to scan the rows of picture elements at a rate which is a function of the number of rows in the panel (10) and the field period of the applied video signal. Using a row scanning rate which is substantially equal to the number of rows divided by the active field period of the applied video signal, all rows of the panel are addressed within the field period of different standards of applied video signal and video picture fills the available display area.

9 Claims, 4 Drawing Sheets

MULTI-STANDARD VIDEO MATRIX DISPLAY APPARATUS AND ITS METHOD OF OPERATION

BACKGROUND OF THE INVENTION

This invention relates to a matrix display apparatus for displaying video signals of two or more different standards which apparatus comprises a display panel having an array of picture elements arranged in a set number of rows and columns and driving means for driving the picture elements according to an applied video signal, the driving means comprising a column driver circuit operable according to the line frequency of an applied video signal for supplying data signals derived therefrom to the columns of picture elements, a row driver circuit for scanning the rows of picture elements in turn, and a control circuit which controls the timing of the operation of the row driver circuit and which is responsive to an applied video signal to control the row scanning rate of the row driver circuit according to the standard of the video signal. The invention relates also to a method of operating such a display apparatus. The invention is concerned particularly, although not exclusively, with liquid crystal display apparatus for displaying TV pictures.

Normally, a matrix liquid crystal display panel is designed for use with one video standard with the number of rows of picture elements being selected having regard to the number of display lines of the video standard. However this leads to problems if it is desired to use the display panel to display video signals of a different standard, as might be required, for example, for a portable TV receiver. If an NTSC (525 line) video signal is displayed on a panel designed for PAL (625 line) video signals a reduced height picture having the wrong aspect ratio is obtained. An external standards-converter could be employed to convert for example an NTSC signal to the PAL standard but this involves complex signal processing techniques and is very expensive in terms of the required circuitry.

There is described in U.S. Pat. No. 5,003,388 a scheme for enabling, for example, a PAL standard video signal to be displayed on a display panel designed for an NTSC standard video signal. In this scheme, converter means are employed which change the number of display lines of the video signal that are actually displayed by discarding selected display lines, in this case every sixth line of the PAL standard signal, thereby enabling a picture according to the PAL standard to be displayed on the display panel. In the apparatus described, a row and column array of picture elements, for example liquid crystal elements, is driven by a data driver circuit which supplies data signals derived from a video signal to the columns of picture elements and a scan driver circuit connected to the rows of picture elements which scans each row in turn. The operations of the data and scan driver circuits are controlled and synchronised by a control circuit using synchronising signals derived from the video signal. The control circuit operates the scan driver circuit at a rate corresponding to the line frequency of the video signal. When, for example, a PAL signal is to be displayed, the scan and data driver circuits are controlled so as to ignore selected, regularly spaced, lines in the video signal, and the sampled data signals pertaining thereto. In this way the PAL standard picture can be made to fit the picture element array. However, as described in this specification, unless certain measures are taken unwanted display artefacts can be produced using this approach. Even if the described measures are taken, which involve changing the position of the deleted lines from field to field, it is likely that display disturbances such as flickering lines will be observed when displaying certain kinds of pictures.

To display an NTSC video signal on a display panel designed for PAL video signals an opposite approach may be possible whereby certain lines in the NTSC signal may be repeated so that in places several rows of picture elements are driven with the same picture information. In this way the picture is effectively expanded in the vertical direction to fill the available display area. Again however, this technique may lead to perceivable display artifacts affecting the quality of the displayed picture. When lines in the picture have to be repeated there is then less time available to address the rows of the display panel and this can result in differences in the picture element voltages for repeated and non-repeated lines.

SUMMARY OF THE INVENTION

It is an object of the present invention to provide a matrix display apparatus capable of multi-standard video operation which is simple and inexpensive to manufacture.

It is another object of the present invention to provide a matrix display apparatus capable of displaying multi-standard video signals which at least to some extent avoids the aforementioned problems.

According to one aspect of the present invention there is provided a matrix display apparatus of the kind described in the opening paragraph which is characterised in that the control circuit is arranged to operate the row driver circuit at a rate which is determined in accordance with the number of rows of picture elements and the field period of an applied video signal.

The row driver circuit of the apparatus is thus operated on a different basis to those of conventional matrix display apparatus and the display apparatus described in U.S. Pat. No. 5,003,388. In conventional display apparatus each line of the video signal is used to address either one or two rows of picture elements of the display panel. In both cases there is a direct relationship between the timing of the operations of the row and column driver circuits. The row and column driver circuits are operated in synchronism with the period of each operation of the two circuits being dictated by the video line frequency. The apparatus of U.S. Pat. No. 5,003,388 operates in similar fashion. In the display apparatus of the present invention the row and column driver circuits are operated in an asynchronous manner. The timing of the row driver circuit is not directly linked with the timing of the column driver circuit according to the line frequency of the video signal but instead is dependent on the number of rows of picture elements in the display. Preferably the row driver circuit is operable by the control circuit to scan the rows at a rate substantially equal to the number of rows divided by the active field period of an applied video signal which ensures that all the rows of picture elements are addressed within the field period of the video signal. Consequently, the video picture fills the available display area, as defined by the row and column array of picture elements, even if the video standard is changed and without the need to utilise additional conversion circuitry to delete or repeat selected lines in the video signal. Importantly, the picture information in the video signal is distributed uniformly over the rows of picture elements. The charging behaviour for example of the picture elements, such as liquid crystal picture elements, means that an averaging effect is produced and discontinuities moving vertically within the displayed picture are avoided. Disturbing artefacts in the displayed picture due to, for example, expansion of the picture are less likely to be visible.

The row driver circuit can be of a conventional form, comprising a digital shift register circuit for example. The timing of its operation, and hence the row scanning rate, is appropriately controlled by control signals applied thereto which are generated in the control circuit on the basis of the number of rows of picture elements and the field period of the applied video signal. As such, the necessary drive means is simple and inexpensive to manufacture.

For simplicity, known types of column driver circuits employed in conventional display apparatus may be retained. Thus, in one embodiment, the column driver circuit may consist of a plurality of stages comprising sample and hold circuits for sampling lines of an applied video signal, with the output of each stage being connected to a respective column of picture elements and with the stages being operable to sample video lines at a rate corresponding to the line frequency of the video signal. In this case, then for a situation in which the number of rows of picture elements is greater than the number of lines in the video signal, for example where an NTSC video signal is displayed on a panel designed for PAL video signals, the operation of the column and row driver circuits is such that the row addressing period becomes shorter than the video line period with the result that some rows receive the same picture information, while for other rows the data signals applied to the columns may change while the row of picture elements is being addressed, whereby the picture elements produce some average of the two lines of the video signal.

Each stage of the column driver circuit may comprise at least two sample and hold circuits whose outputs are alternately switched by switch means operable by the control circuit at a rate corresponding to the video line frequency. The operation of the column driver circuit may follow that of known column driver circuits in which each stage comprises a pair of sample and hold circuits controlled via a shift register circuit. While one sample and hold circuit is sampling the applied video line waveform, the contents of the other is supplied to an associated column conductor, via a buffer amplifier, and transferred to a picture element in the selected row. At the end of each video line the sample and hold circuits are switched whereby the contents of the one circuit is supplied to the column conductor while the other performs the sampling function.

In other embodiments of the display apparatus, a modified column driver circuit may be used to provide improved performance. In one version of a modified column driver circuit, the stages may include signal smoothing circuits, for example low pass filters or linear interpolation circuits, connected between the sample and hold circuits and the outputs so that successive sampled signals, and transitions therebetween, are smoothed. In another version of modified column driver circuit, each stage may include a further sample and hold circuit between the signal smoothing circuit and the output of the stage, which further sample and hold circuit is arranged to be operated by the control circuit at the row scan rate. The further sample and hold circuit performs a re-sampling function so that the level of the data signal applied to a column of picture elements is held constant while each row of picture elements is addressed.

According to another aspect of the present invention, there is provided a method of operating a matrix display for displaying applied video signals of two or more different standards and comprising a display panel having an array of picture elements arranged in a set number of rows and columns and driving means for driving the picture elements according to an applied video signal and comprising a column driver circuit for supplying data signals derived from an applied video signal to the columns of picture elements and a row driver circuit for scanning the rows of picture elements in turn at rates which differ according to the standard of the applied video signal, characterised in that the row driver circuit operates to scan the rows of picture elements at a rate which is a function of the number of rows of picture elements and the field period of the applied video signal.

The invention is particularly applicable to liquid crystal matrix display apparatus, although it is envisaged it could be used to advantage in other forms of matrix display apparatus comprising matrix arrays of picture elements, for example electrochromic or electrophoretic elements, and intended for displaying video signals.

BRIEF DESCRIPTION OF THE DRAWING

Matrix display apparatus, and their methods of operation, in accordance with the present invention will now be described, by way of example, with reference to the accompanying drawing figures in which.

It should be understood that the Figures are merely schematic and are not drawn to scale. It should also be understood that the same reference numerals are used throughout the Figures to indicate the same or similar parts.

DESCRIPTION OF THE PREFERRED EMBODIMENTS

Figure 1:
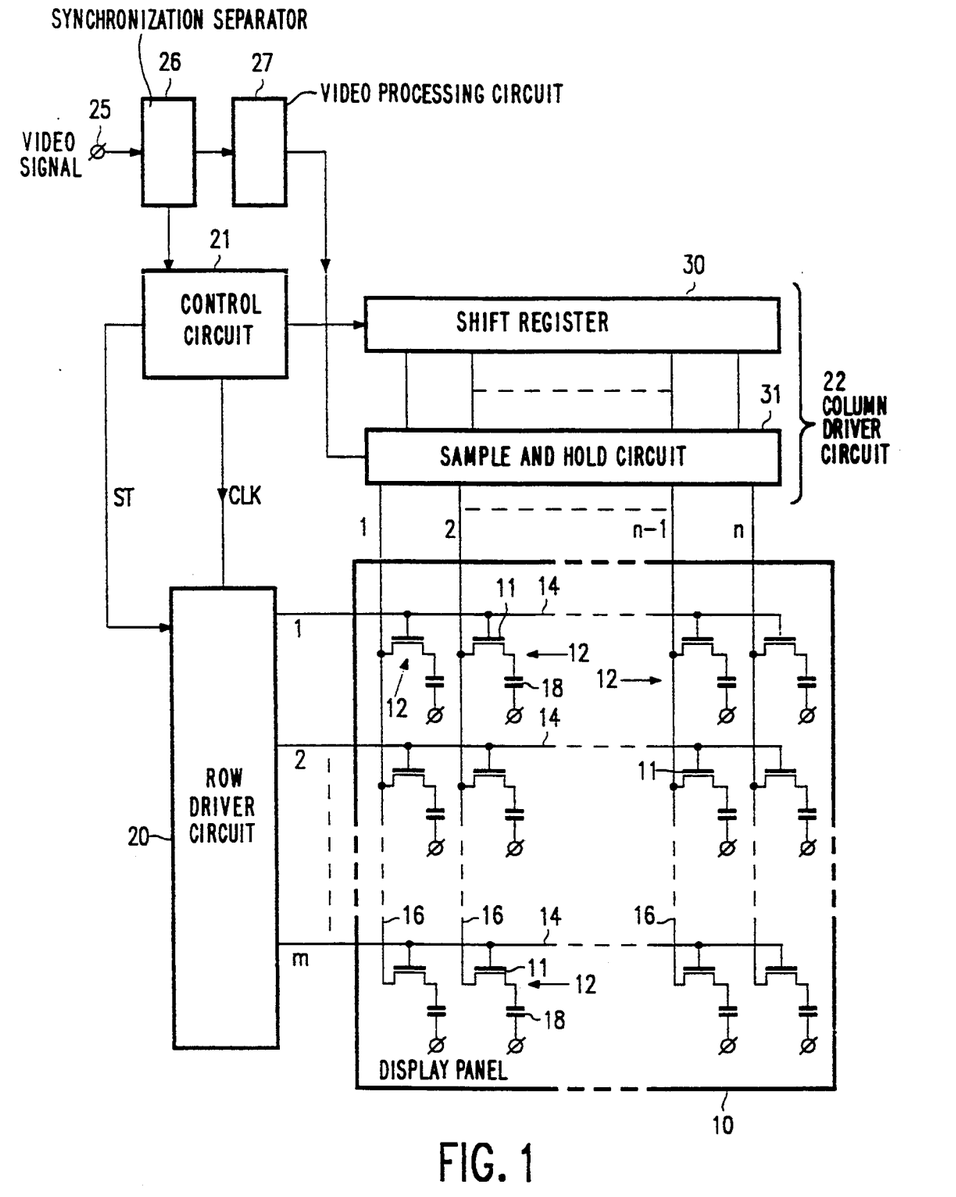
FIG. 1 is a schematic circuit diagram of an embodiment of matrix display apparatus according to the invention.

FIG. 1 shows in highly simplified block form the circuit configuration of a liquid crystal matrix display apparatus for displaying video, e.g. TV, pictures, of different standards. Referring to FIG. 1, the display apparatus comprises an active matrix addressed liquid crystal display panel 10 having a row and column array of picture elements which consists of m rows (1 to m) with n horizontally arranged picture elements 12 (1 to n) in each row. Only a few of the picture elements are shown for simplicity. In practice, the total number of picture elements in the matrix array may be several hundreds of thousands. Each picture element 12 includes a respective switching device, in this example in the form of a thin film transistor, TFT 11, and an LC element 18 and is located adjacent a respective intersection of sets of row and column address conductors 14 and 16. The gate terminals of all TFTs 11 associated with picture elements in the same row are connected to a common row conductor 14 to which, gating signals are supplied. Likewise, the source terminals of the TFTs of all picture elements in the same column are connected to a common column conductor 16 to which data (video information) signals are applied. The display panel is illuminated by a light source disposed on one side and light entering the panel is duly modulated according to the transmission characteristics of the LC elements 18 as determined by the data signals applied thereto.

Liquid crystal matrix display apparatus intended for displaying video pictures are well known and as such it is considered unnecessary to provide here a full and detailed description of the general aspects of the apparatus. For further information reference is invited for example to GB-A-2162984, GB-A-2134300, and also the aforementioned U.S. Pat. No. 5,003,388, whose disclosures are incorporated herein by reference.

The display panel 10 is driven by row and column driver circuits 20 and 22 connected to the sets of row and column address conductors 14 and 16 respectively. The row and column driver circuits 20 and 22 in this embodiment are of conventional type and as such will not be described here in detail. Briefly, the row driver circuit 20 comprises a digital shift register whose operation is controlled by regular clocking pulses and control signals from a control circuit 21 to which synchronisation signals derived from a video signal applied to an input 25 are supplied from a synchronisation separator 26, and is operable by the control circuit to scan the row conductors 14 successively with gating signals. In the intervals between gating signals the row conductors are supplied with a substantially constant reference potential. Video data signals are supplied to the column conductors 16 from the column driver circuit 22 which comprises a shift register circuit 30 and a sample and hold circuit 31. The circuit 22 is supplied with a video information signal from a video processing circuit 27 and derived from the video signal applied to the input 25. The synchronisation signals obtained in the synchronisation separator 26 from the timing information of the input video signal are used by the control circuit 21 to produce timing signals for controlling the column driver circuit. The column driver circuit 22 performs serial to parallel conversion of the video information signal appropriate to the addressing of the panel 10. The panel 10 is driven on a row at a time basis by scanning the row conductors 14 sequentially with a gating (select) signal so as to turn on each row of TFTs in turn and applying data signals to the column conductors. Using one row at a time addressing all TFTs 11 of the addressed row are switched on for a period determined by the duration of the gating signal during which video information signals present on the column conductors 16 are transferred to the picture elements 12. Upon termination of the gating signal, the TFTs 11 of the row are turned off thereby isolating the picture elements from the conductors 16.

To avoid electrochemical degradation of the LC material, the polarity of the drive signals applied to the picture elements 12 is periodically inverted in accordance with known practice although for simplicity the means by which this is achieved is not shown in FIG. 1. This polarity inversion can take place after every complete field of the display panel (field inversion) and optionally after every row address as well (line inversion).

The display panel 10 in this embodiment is designed to display PAL standard video signals having 625 lines (575 active lines) and the number of rows, m, of picture elements is chosen accordingly to match the number of active lines in the video signal. In the case of a half resolution display, the panel therefore has 288 rows of picture elements, and, for example, 468 columns. The panel 10 could instead be a full resolution display panel having 575 rows and, for example, 720 columns. The display apparatus is intended also to display video signals of other standards, for example an NTSC video signal having 525 lines (484 active lines) and to this end the operation of the row and column circuits 20 and 22 in addressing the display panel 10 is different to that of conventional display apparatus intended to display just one video standard. In such conventional apparatus, the operations of the row and column driver circuits are synchronised and are controlled in accordance with the video line frequency of the applied signal. Each line in the video signal is used to address one row of picture elements, (or in the case of a full resolution display two rows where the so-called line pairing drive scheme is employed) and there is a direct link between the timings of the operations of the row and column driver circuits, with the period of each operation being determined by the video line frequency. Thus operation of the shift register 30 is initiated by a regular clock signal corresponding to the video line frequency and the row driver circuit is clocked by a regular clock signal whose frequency similarly corresponds to the video line frequency (i.e. the horizontal synchronising signal frequency) so that the rows are scanned at a rate corresponding to the video line rate. In the display apparatus of FIG. 1, however, the timing of the operation of the row driver circuit 20 is determined instead according to both the number of rows of picture elements and the field period of the applied video signal. The operation of the row driver circuit 20 in this respect is controlled by the control circuit 21 which provides a start signal ST derived from the vertical synchronisation signal of the applied video signal and a regular clock signal CLK which is a function of the field period of the video signal and the number of rows, m, in the display panel. More particularly, the clock signal CLK generated in the circuit 21 has a frequency substantially equal to m divided by the active field period of the video signal. The clock signal frequency, and hence rate at which the row driver input 20 scans the rows, is thus determined by the circuit 21 in accordance with the video signal field period and number of rows and such that all the rows in the display panel are addressed within one field period of the video signal with an equal addressing period for all rows. With the column driver circuit 22 being controlled in conventional manner, it will be appreciated then that the row and column driver circuits operate asynchronously.

When displaying PAL standard video signals the effect of such operation of the row driver circuit 20 is that the display panel 10 is addressed in substantially the same way as in a conventional, single standard, display apparatus whose row and column driver circuits both operate at the video signal line rate. Thus, a gating signal is applied to each row address conductor 14 in turn successively at a constant rate corresponding to the video signal line rate. The duration of the gating signals is approximately equal to a video signal line period, T1, or less. In the case of a half resolution PAL standard video signal having a line period of 64 microseconds, each row conductor is supplied with a gating signal at intervals of 20 milliseconds.

When a different standard of video signal is applied, for example an NTSC video signal (525 lines), the timing and control circuit 21 responds to the different video signal field period, as determined by the field synchronising signal, to alter the frequency of the clock signal CLK applied to the circuit 20 for controlling the row scan rate with the new clock signal frequency again being determined by the field period and the number of rows and substantially equal to the number of rows divided by the active field period so as to ensure that all the rows of picture elements are scanned within the active field period of this video signal. Consequently, the video picture fills the available display area even though a different video signal standard is used.

Although the above embodiment has been described as having a display panel designed for one video signal standard (PAL) and operable to display one or more other video signal standards having fewer lines, the reverse situation is also possible. Thus the display panel may be designed for a video signal standard such as NTSC and the apparatus operable to display one or more other video signal standards, such as PAL, having a greater number of lines.

The performance of the display apparatus is illustrated in FIG. 2 which is a timing diagram depicting the relative timings for various operations for the case in which the panel 10 has 288 rows of picture elements providing a half resolution display. FIG. 2a represents the video signal line periods, several successive lines being indicated at m, m+1, m+2, etc., and an individual line period being indicated at T1. These periods correspond to the periods during which the column driver circuit 22 samples the applied video signal. FIG. 2b represents the periods during which the sampled voltages from line x are applied to the column conductors 16, this transfer involving samples from the preceding video line while the current line is being sampled. In a conventional single standard, half resolution display in which each video signal line is used to address one row of picture elements the timing of the operations of the row and column driver circuits is determined by the video line (horizontal synchronising signal) frequency. This is illustrated in FIG. 2c which represents the periods during which individual rows of picture elements, here designated N, N+1, etc., are selected, by the application of a gating signal from the row driver circuit 20, to transfer the video information to the picture elements in that row. The row address periods, one of which is indicated at Tr1, correspond with the video line periods T1. When the display apparatus of FIG. 1 is operated with a PAL video signal having 288 active lines per field, for which the display panel 10 is designed, the row driver circuit 20 operates with substantially identical effect as in this conventional apparatus, with the row address periods, Tr1, substantially corresponding to the video line periods T1.

Figure 2A:
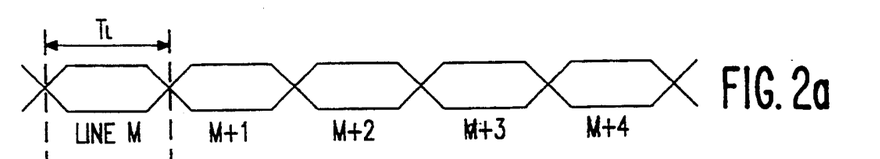
FIGS. 2a to 2d is a timing diagram for illustrating the relative timings of row and column driving operations in the display apparatus.
Figure 2B:
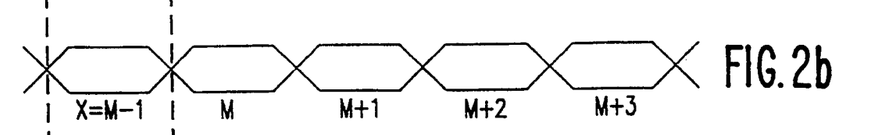
Figure 2C:
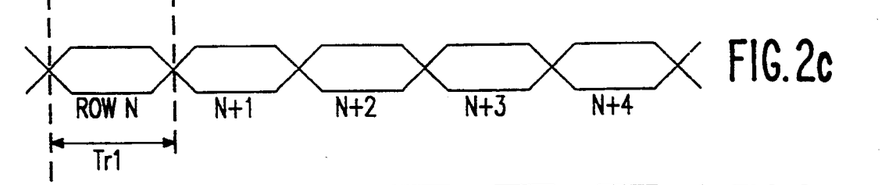
Figure 2D:
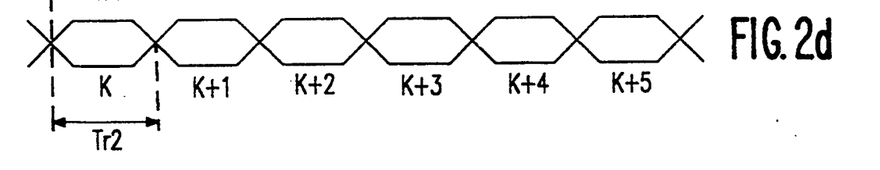

When the display apparatus is operated to display an NTSC standard video signal (242 active lines per field) and with the row scanning frequency being set by the circuit 21 as previously described so that all the rows in the display panel are addressed within one field period, there is no longer a 1:1 relationship between the information in the lines of the video signal and that shown on the display panel as the numbers of rows of picture elements is greater than the number of lines in the video signal. FIG. 2d shows the addressing periods for the rows of the display panel, designated k, k+1, k+2, etc., in this situation. As there are more rows than video lines, the row addressing period, Tr2, is shorter than the video line period with the result that some rows in the display panel receive picture information from one video line, for example rows k and k+5, while for other rows the picture information applied to the column conductors 16 changes while the row is being addressed, for example rows k+1, k+2, k+3 and k+4. Where this occurs, and depending on the dynamic behaviour of the picture elements, the information that appears on the rows will be some average of the two lines of the video signal. The overall effect is that the picture will fill the available display area of the panel. Lines of information are averaged as determined by the detailed timing so that each row in the display panel is addressed with the appropriate information.

With the display apparatus operating in this manner the picture information is uniformly distributed over the available rows of picture elements in the panel. Each row is addressed in turn at a constant rate in each field period and the scanning does not alter from field to field of the applied video signal. Consequently, the displayed picture will be more uniform and less likely to have display artefacts than with known multi-standard drive schemes involving line repetition or line deletion.

Figure 3A:
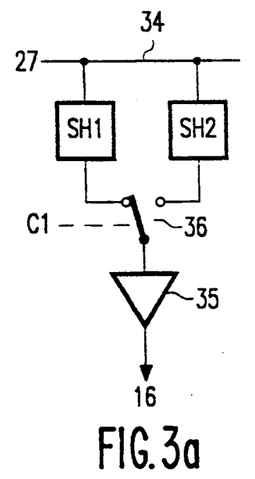
FIGS. 3a to 3c are simplified schematic circuit diagrams of a part of an individual stage in alternative forms of column driver circuits used in the apparatus.
Figure 3B:
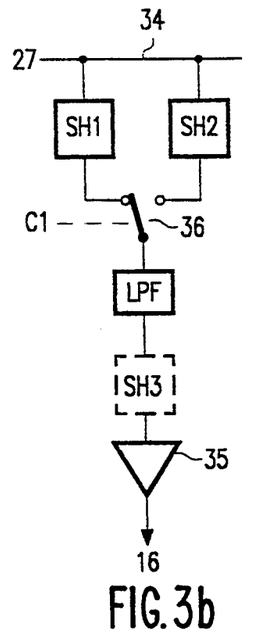
Figure 3C:
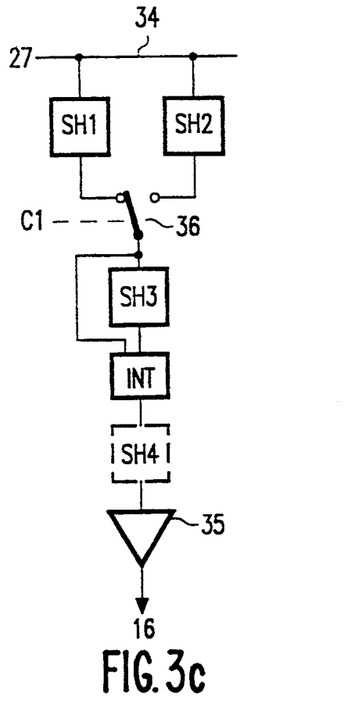
Figures 4A, 4B:
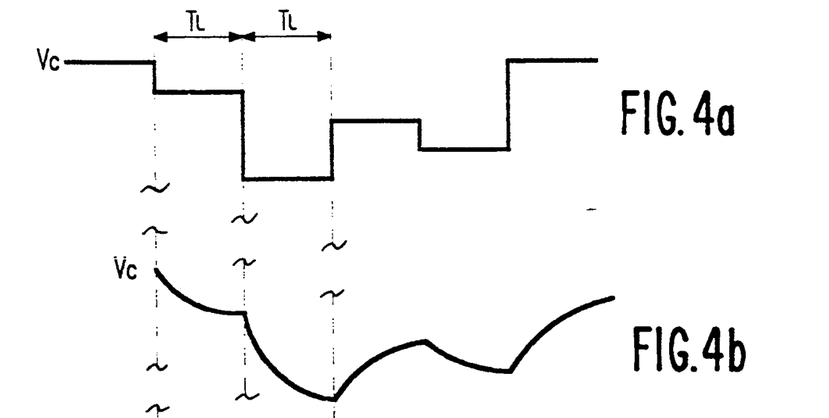
FIGS. 4a to 4c illustrate typical data signal voltage waveforms produced by each of the circuits of FIGS. 3a to 3c respectively.

The display apparatus can readily be implemented using known types of column and row driver circuits. However, in some circumstances the apparatus may not provide a sufficiently acceptable reproduction of all kinds of picture material. FIG. 3a shows in simple schematic form the circuit for one output stage of a conventional type of column driver, while FIG. 3b and 3c illustrate the circuits of individual stages in two modified forms of column driver circuits. For simplicity, all three circuits are for the case in which the display apparatus is driven using a field inversion drive scheme. The circuit of FIG. 3a consists of two sample and hold sections SH1 and SH2 which sample the video waveforms applied to line 34 under the control of the outputs of the shift register 30 and a control signal C1 supplied by the control circuit 21 and determined by the video signal line frequency. For clarity the shift register control circuitry has been omitted in this and the following Figures. While the first section SH1 samples the video information waveform the output of the second, SH2, is connected to the associated column conductor 16 of the display panel via a buffer amplifier 35. At the end of each video line period the output switch 36 is toggled by C1 so that the two sample/hold sections swap functions whereby SH2 samples the video signal and SH1 provides the output, data signal, voltage. The output waveform Vc produced by this circuit and applied to the column conductor 16 steps from one sampled voltage to the next at the video line rate as shown in FIG. 4a.

In the simple addressing scheme described above, the dynamic behaviour of the picture elements provide some filtering of the transitions in the column voltage when NTSC signals are displayed for which the row address periods $Tr_2$ and the video line periods T1 do not correspond. This can be done in a more controlled way in the column driver circuit 22 rather than the picture elements 12 by introducing a signal smoothing circuit comprising a low pass filter (LPF) into the column driver stage as shown in FIG. 3b. This filter may be implemented using a resistor-capacitor combination or by using switched capacitor techniques. An example of the Vc signal waveform then appearing at the output of the filter is illustrated in FIG. 4b. As a further refinement, this waveform can be re-sampled by a further sample and hold section indicated at SH3 which is operated at the row scanning rate so that the column output voltage is held constant while each row in the display panel is addressed. The effect of this circuit is to filter and then re-sample the vertical information in the picture, effectively approximating the picture information corresponding to the positions of the rows in the display panel where this does not match the lines in the video signal.

Figure 4C:
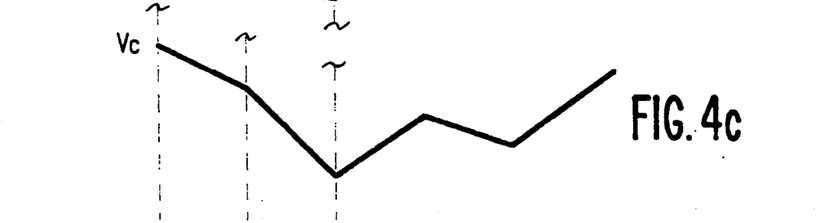

A second way of estimating the picture information between the known, sampled, values is to perform a linear interpolation. A circuit for this is illustrated in FIG. 3c. The circuit block INT together with a sample-and hold circuit SH3 operated at the video line rate by the circuit 21 takes as its inputs the values of samples from two successive lines of the video signal and produces an output voltage which changes linearly between the two sampled values over the line period of the video signal. The resulting waveform, which is illustrated in FIG. 4c, can then be re-sampled by sample and hold circuit SH4, operating at row scanning rate as in the previous case, to provide the column conductor drive voltage waveform for the display panel.

Figure 5:
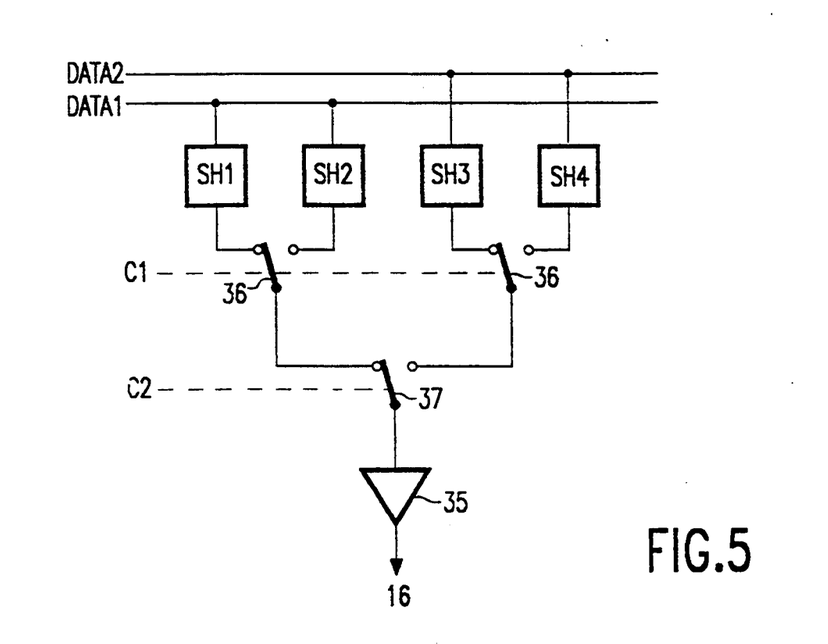
FIG. 5 illustrates schematically a typical stage of another form of column driver circuit for use in a monochrome version of the display apparatus.

Monochrome display apparatus, including those used in a three channel colour projection system, can be driven by known column driver circuits using the basic scheme. FIG. 5 illustrates schematically one stage of such a circuit associated with a respective column conductor. The circuit consists of two pairs of sample and hold circuits, SH1, SH2 and SH3, SH4. These take samples from two separate video input signals, data1 and data2. Two control signals are also provided which control which of the circuits are sampling at any moment, either SH1 and SH3, or SH2 and SH4, and also which sample circuit is connected to the output buffer 35. To drive a monochrome display in line inversion a video signal of one polarity is fed into data1 and the opposite polarity to data2. The switches 36 are toggled by the control signal C1 at the video line rate so that each line is sampled in turn. Th switch 37 is toggled by control signal C2 supplied by the control circuit 21 at the row scanning frequency so that the polarity of the column drive signal Vc is inverted after each row in the display panel is addressed. Signal smoothing circuits as described above can be included between the switches 36 and 37.

Figure 6:
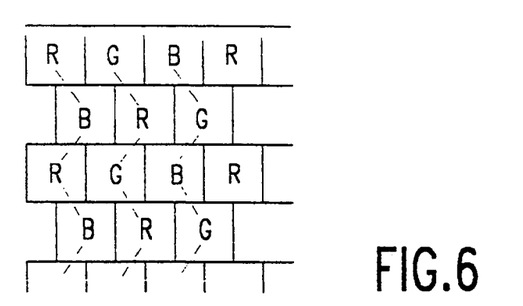
FIG. 6 depicts the lay-out of picture elements and colour filters in a colour version of the display apparatus.

In the case of a colour display apparatus having a mosaic colour filter, the column driver circuit is complicated by the need to switch the colour information applied to the column conductors of the display panel as each row is addressed. FIG. 6 shows a typical, staggered, arrangement of the colour filters. The R, G and B (red, green and blue) filter elements each correspond with a respective picture element. The dashed lines indicate how the column conductors 10 of the display panel are connected to their associated column of picture elements. For line inversion drive the display panel is driven with a column voltage which is inverted in polarity after each row is addressed. In addition the colour information is alternated between two of the three colour signals for successive rows. For example, considering the column on the left of FIG. 6 the colour signal is alternated between red and blue. In any one column only two colour information signals are required. In the chosen example column these are the red signal and the inverted blue signal and these can be provided by the column drive circuit of FIG. 5 by connecting the red signal to the data1 input and inverted blue to data2. This column driver circuit can also be used if the connection of the picture elements to the column conductors is such that each column conductor is associated with picture elements of only one colour.

Figure 7A:
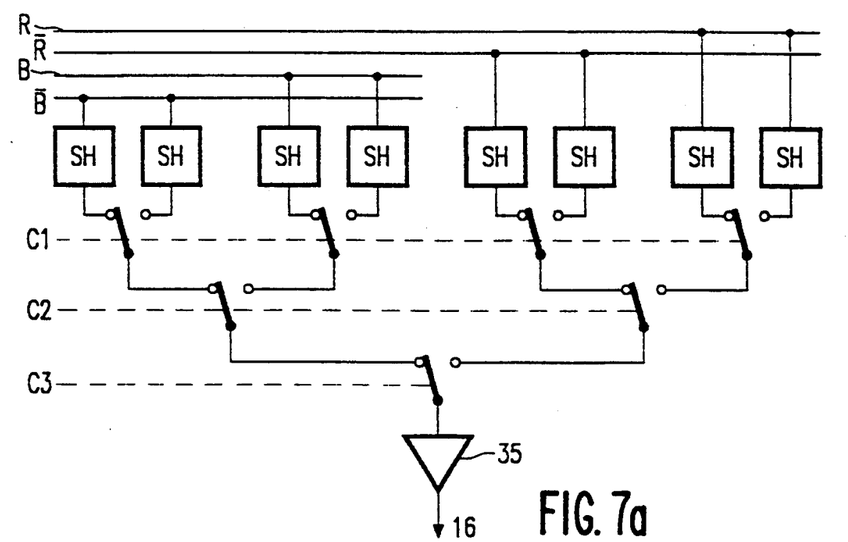
FIGS. 7a and 7b illustrate schematically a typical stage of two further forms of column driver circuits for use in the colour version of the display apparatus.
Figure 7B:
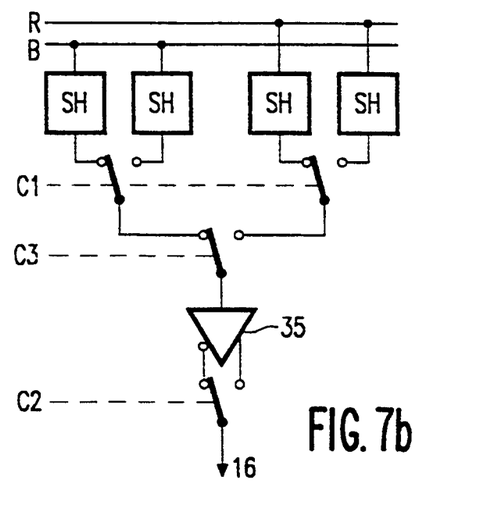

When an alternative drive scheme of the kind in which the signal polarity is inverted after every second row is used, any single column conductor must be driven with four different signals. For example the column conductor on the left of FIG. 6 must be driven with the normal red and blue signals and also with the inverted red and blow signals. For the proposed driving scheme, at any moment in time the column driver circuit must be able to provide any one of the four possible column signals as required to address the rows. The column driver circuit in the previous section can only provide one of two possible output signals. For this drive method a more complex driver is required as shown schematically in FIG. 7a or 7b. In these Figures the control signals C1, C2 and C3 supplied by the circuit 21 are of frequencies corresponding respectively to video line rate, row scanning rate, and half row scanning rate.

Although in the above described embodiments a liquid crystal display panel using TFTs as switching elements for the picture elements is used, it will be appreciated that other forms of display panel may be employed instead. Thus a liquid crystal display panel using two terminal non-linear devices such as MIMs or diodes as switching elements may be used, for example as described in GB-A-2129183. Further, the display panel need not be of an active matrix type but could alternatively be of a passive type.

From reading the present disclosure, other modifications will be apparent to persons skilled in the art. Such modifications may involve other features which are already known in the field of video matrix display apparatus and which may be used instead of or in addition to features already described herein.

I claim:

1. A matrix display apparatus for displaying an applied video signal in the form of any one of a plurality of different standards, which apparatus comprises a display panel having an array of picture elements arranged in a set number of rows and columns and driving means for driving the picture elements according to the applied video signal, the driving means comprising a column driver circuit operable according to the line frequency of the applied video signal for supplying data signals derived therefrom to the columns of picture elements, a row driver circuit for scanning the rows of picture elements in turn, and a control circuit which controls the timing of the operation of the row driver circuit and which is responsive to the applied video signal to control the row scanning rate of the row driver circuit according to the standard of the applied video signal, characterised in that the control circuit is arranged to operate the row driver circuit at a rate which is substantially equal to the number of rows of picture elements in the display panel divided by the active field period of the applied video signal.

2. A matrix display apparatus according to claim 1, characterised in that the column driver circuit comprises a plurality of stages comprising sample and hold circuits for sampling lines of an applied video signal, the output of each stage being connected to a respective column of picture elements of the panel, and in that the stages are operable to sample lines of an applied video signal at a rate corresponding to the line frequency of the video signal.

3. A matrix display apparatus according to claim 2, characterised in that each stage of the column driver circuit comprises at least two sample and hold circuits whose outputs are alternately switched by switch means operable by the control circuit at a rate corresponding to the line frequency of an applied video signal.

4. A matrix display apparatus according to claim 3, characterised in that the stages of the column driver circuit include signal smoothing circuits connected between the sample and hold circuits and the outputs of the stages.

5. A matrix display apparatus according to claim 4, characterised in that the signal smoothing circuits comprise low pass filter circuits.

6. A matrix display apparatus according to claim 3, characterised in that the signal smoothing circuits comprise linear interpolation circuits.

7. A matrix display apparatus according to claims 4, 5 or 6, characterised in that each stage of the column driver circuit includes a further sample and hold circuit connected between the signal smoothing circuit and the output of the stage which is arranged to be operated by the control circuit at the row scanning rate.

8. A method of operating a matrix display for displaying an applied video signal in the form of any one of a plurality of different standards and comprising a display panel having an array of picture elements arranged in a set number of rows and columns, and driving means for driving the picture elements according to the applied video signal, said method including the steps of supplying data signals derived from the applied video signal to the columns of picture elements and scanning the rows of picture elements in turn at rates which are determined from the standard of the applied video signal, characterised in that the rows of picture elements are scanned at a rage which is substantially equal to the number of rows of picture elements in the panel divided by the active field period of the applied video signal.

9. A method according to claim 8, characterised in that the column driver circuit is operated to sample individual lines of an applied video signal at a rate corresponding to the line frequency of the applied video signal and in that successive sampled signals for each column of picture elements are smoothed before being supplied to the columns of picture elements.

* * * * *